United States Patent
Zivkovic et al.

(10) Patent No.: US 9,916,531 B1
(45) Date of Patent: Mar. 13, 2018

(54) ACCUMULATOR CONSTRAINED QUANTIZATION OF CONVOLUTIONAL NEURAL NETWORKS

(71) Applicant: INTEL CORPORATION, Santa Clara, CA (US)

(72) Inventors: Zoran Zivkovic, 's-Hertogenbosch (NL); Barry de Bruin, Ophemert (NL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/629,981

(22) Filed: Jun. 22, 2017

(51) Int. Cl.
*G06N 3/08* (2006.01)
*G06N 3/04* (2006.01)
*H04N 19/126* (2014.01)

(52) U.S. Cl.
CPC .......... *G06N 3/08* (2013.01); *G06N 3/04* (2013.01); *H04N 19/126* (2014.11)

(58) Field of Classification Search
None
See application file for complete search history.

(56) References Cited

U.S. PATENT DOCUMENTS

| | | | |
|---|---|---|---|
| 7,548,892 B2 * | 6/2009 | Buck | G06N 3/08 382/157 |
| 2016/0328644 A1 * | 11/2016 | Lin | G06N 3/08 |
| 2016/0328647 A1 * | 11/2016 | Lin | G06N 3/08 |
| 2017/0277658 A1 * | 9/2017 | Pratas | G06F 17/153 |
| 2017/0286830 A1 * | 10/2017 | El-Yaniv | G06N 3/08 |

OTHER PUBLICATIONS

Na, Taesik et al. Speeding Up Convolutional Neural Network Training with Dynamic Precision Scaling and Flexible Multiplier-Accumulator, Proceedings of the 2016 International Symposium on Low Power Electronics and Design pp. 58-63, Aug. 2016, Association of Computing Machinery (ACM), ACM digital library, https://dl.acm.org/.*
Gysel, et al.; "Hardware-Oriented Approximation of Convolutional Neural Networks", Department of Electrical Engineering, University of California, Davis, Apr. 2016, 8 pages.
Tensorflow; "How to Quantize Neural Networks with Tensor Flow", last updated Jun. 2019, retrieved from the Internet Jun. 22, 2016; (https://www.tensorflow.org/performance/quantization).

* cited by examiner

*Primary Examiner* — Howard Williams
(74) *Attorney, Agent, or Firm* — International IP Law Group, P.L.L.C.

(57) ABSTRACT

An apparatus is described herein. The apparatus comprises an accumulator, a controller, and a convolutional neural network. The accumulator is to accumulate a plurality of values within a predetermined bit width. The controller is to determine a parameter quantization and a data quantization. The convolutional neural network is adapted to the data quantization, wherein a quantization point is selected based on the parameter quantization, data quantization, and accumulator bit width.

25 Claims, 6 Drawing Sheets

400

500

ACCUMULATOR CONSTRAINED QUANTIZATION OF CONVOLUTIONAL NEURAL NETWORKS

BACKGROUND ART

A neural network can be thought of as a system that mimics the structure of the human brain. The neural network may be divided into layers, and each layer may include a plurality of nodes. Each node may function similarly to a neuron. In examples, a particular input value may be applied to any number of the nodes of the network. Each input value of each node is given a weight, and each node generates an output value that is a function of the sum of its weighted input values. The weight that is assigned to a particular input value is determined by a data transfer function, which may be constant or may vary over time. Moreover, various multiplication and accumulation functions may be used in the neural network to converge on a solution.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

Figure 1:
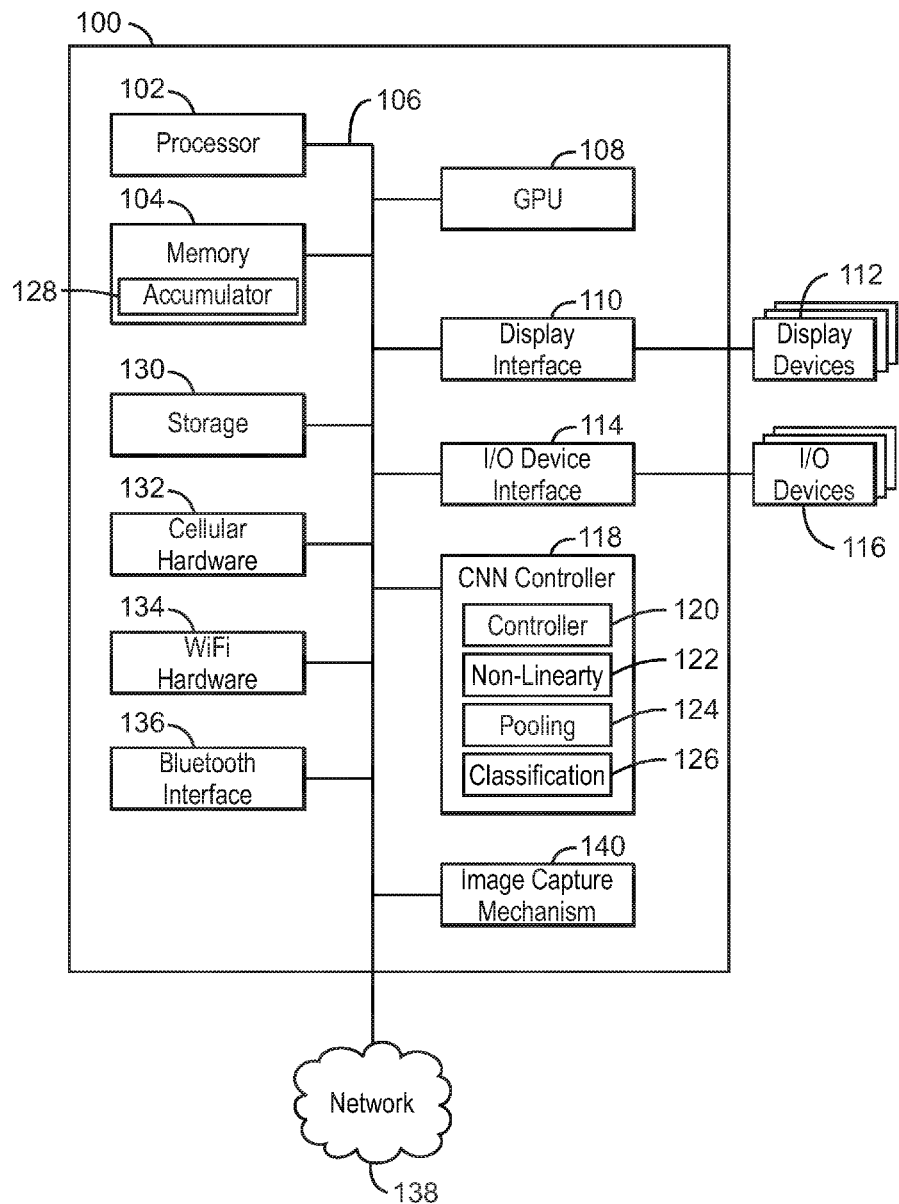
FIG. 1 is a block diagram of an electronic device for accumulator constrained quantization convolutional neural networks (CNNs)

Neural networks are often developed and trained using floating point arithmetic. In particular, convolutional neural networks (CNN) typically use high precision floating point numbers to represent the parameters and intermediate results during training. For example, the weights and biases of the CNN may be modified during the training of neural networks using a floating point precision. The training is typically performed on a high-performance platform with high precision support, such as a graphics processing unit (GPU). In some examples, these networks can occupy a large portion of memory. Further, these large networks can use extensive computational resources to complete calculations associated with the neural network.

A trained network may be used for inference on a different computing platform, such as a digital signal processor or a dedicated CNN accelerator. As used herein, inference may refer to the solution that the CNN is trained to determine. For example, an inference may be a facial recognition solution output by the neural network. A neural network is often quantized to enable efficient execution on other computing platforms. As used herein, quantization is a general term that includes many different techniques to store networks and associated numbers, and to perform calculations on the numbers in a more compact and efficient format when compared to calculations using high precision floating point values. Many deep learning networks can operate using limited precision representations with minor degradations in recognition performance.

Embodiments described herein enable neural network quantization constrained by an accumulator. In particular, the present techniques enable a quantization approach tailored for computation platforms without wide accumulation support. In embodiments, an accumulator is to accumulate a plurality of values within a predetermined bit width. A parameter quantization and a data quantization may be determined according to various constraints. A convolutional neural network is adapted to the data quantization, wherein a quantization point is selected based on the parameter quantization, data quantization, and accumulator bit width.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

FIG. 1 is a block diagram of an electronic device 100 for accumulator constrained quantization of convolutional neural networks (CNNs). The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random-access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads. For example, the GPU 108 may include an engine that processes data from the image capture mechanism 140.

The CPU 102 can be linked through the bus 106 to a display interface 110 configured to connect the electronic device 100 to a display device 112. The display device 112 can include a display screen that is a built-in component of the electronic device 100. The display device 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

The electronic device 100 also includes a CNN controller 118. The CNN controller may include a combination of hardware and software that is to enable CNN operations, including but not limited to convolution 120, non-linearity 122, pooling 124, and classification 126. The convolution 120 operation may be used to extract features from the input data. The non-linearity 122 operation may be an element wise operation that is to introduce non-linearity to a CNN. In embodiments, the non-linearity 122 operation may be enabled by a rectified linear unit (ReLU). The pooling 124 operation may be used for down sampling in order to reduce the dimensionality of a feature map. While dimensionality may be reduced, important information is retained by the feature map. The classification 126 operation may be enabled by a fully connected layer. The classification 126 operation takes as input feature data and uses the feature data to classify the input data.

In embodiments, each of the convolution 120 operation and the classification 126 operation may be described as generic multiply and accumulate operations. In particular, the convolution 120 operation may extract features from the input data via convolution, where element wise multiplication is applied to the input data and a final output value is obtained by summing or accumulating each element wise multiplication output. The classification 126 operation classifies the input data using probabilities. In embodiments, the sum of the probabilities is one.

The generic multiply and accumulate operations used to implement the convolution 120 operation and the classification 126 operation can be executed via hardware, software, or any combination thereof. For example, the memory 104 may include an accumulator 128. The accumulator may take as input a first value and then generate a second value. The accumulator 128 can be used to execute the convolution 120 operation and the classification 126 operation. For ease of description, the accumulator is illustrated as a component of the memory 104. However, the accumulator 128 or a plurality of accumulators are often implemented as internal registers of the CPU or GPU. The accumulator 128 or a plurality of accumulators may also be a component of an internal register of a CNN accelerator, a digital signal processor (DSP), or the CNN controller 118.

The electronic device may also include a storage device 130. The storage device 130 is a physical memory such as a hard drive, an optical drive, a flash drive, an array of drives, or any combinations thereof. The storage device 130 can store user data, such as audio files, video files, audio/video files, and picture files, among others. The storage device 130 can also store programming code such as device drivers, software applications, operating systems, and the like. The programming code stored to the storage device 130 may be executed by the CPU 102, GPU 108, or any other processors that may be included in the electronic device 100.

The CPU 102 may be linked through the bus 106 to cellular hardware 132. The cellular hardware 132 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 100 may access any network 138 without being tethered or paired to another device, where the network 138 is a cellular network.

The CPU 102 may also be linked through the bus 106 to WIFI hardware 134. The WIFI hardware is hardware according to WIFI standards (standards promulgated as Institute of Electrical and Electronics Engineers' (IEEE) 802.11 standards). The WIFI hardware 134 enables the electronic device 100 to connect to the Internet using the Transmission Control Protocol and the Internet Protocol (TCP/IP), where the network 138 is the Internet. Accordingly, the electronic device 100 can enable end-to-end connectivity with the Internet by addressing, routing, transmitting, and receiving data according to the TCP/IP protocol without the use of another device. Additionally, a Bluetooth Interface 136 may be coupled to the CPU 102 through the bus 106. The Bluetooth Interface 136 is an interface according to Bluetooth networks (based on the Bluetooth standard promulgated by the Bluetooth Special Interest Group). The Bluetooth Interface 136 enables the electronic device 100 to be paired with other Bluetooth enabled devices through a personal area network (PAN). Accordingly, the network 138 may be a PAN. Examples of Bluetooth enabled devices include a laptop computer, desktop computer, ultrabook, tablet computer, mobile device, or server, among others. While one network is illustrated, the electronic device 100 can connect with a plurality of networks simultaneously.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102, GPU 108, and CNN controller 118 may be partially, or entirely, implemented in hardware such as a processor and/or software. For example, the functionality may be implemented with an application specific integrated circuit, in logic implemented in a processor, in logic implemented in a specialized graphics processing unit, or in any other device. Moreover, the accumulator 128 may be located in a local memory of the CNN controller, GPU 108, CPU 102, or any combination thereof.

The present techniques enable CNN quantization tailored for a computation platform without wide accumulation support. As used herein, accumulator width refers to a bit width of the accumulator. A wide accumulator may operate using bit widths of 24 bits for 8-bit data, or 48 bit accumulators for 16-bit data. By contrast, a bit width may be considered narrow with regard to an accumulator when, for example, 8-bit data is processed using an 8-bit accumulator, or 16-bit data is processed using a 16-bit accumulator. Put another way, an accumulator may be considered narrow when a particular bit width of data is processed by an accumulator of the same bit width. However, other examples of a narrow accumulator may be 8-bit data processed by a 16-bit accumulator or 16-bit data processed by a 32-bit accumulator. Thus, in embodiments, a narrow accumulator may be an accumulator with a relatively small bit width compared to the bit width of data to be processed by the accumulator.

A narrow accumulator often creates a data bottleneck when executing the CNN. The present techniques use quantization to find a data representation and bit width that makes optimal use of the available bit width of the accumulator. In embodiments, the accumulator may represent data values in two's complement format. Based on this assumption, a constraint is introduced that the final accumulated value for the CNN tasks should fit into the narrow accumulator, while the accumulator may overflow for the in-between, intermediate results.

In embodiments, the present techniques may optimize performance of a CNN for a compute platform without wide accumulation support. As used herein, a lack of wide accumulation support refers to a system that includes accumulators with a narrow bit width as described above. The lack of wide accumulation support may be determined when comparing the accumulator of the computing platform to the bit widths present in the CNN. Convolutional and fully connected layers of a typical CNN require large bit widths for accumulation of the intermediate results. A digital signal processor (DSP) dedicated to computer vision applications will typically have wide accumulator support. However, having a large accumulator data path next to the regular data path may complicate the processor design and programming. Many existing embedded DSPs which are not specifically designed for CNN inference do not have the wide accumulation support. The present techniques can use existing embedded DSPs which are not specifically designed for CNN inference quite efficiently based on the quantization techniques described herein. Further, these techniques may be applied to common CNNs, such as LeNet, AlexNet, and VGG.

Moreover, the present techniques introduce a number of constraints that will limit the number of quantization points to consider. Often, searching for an optimal quantization point is slow. A conventional quantization procedures often check a large number of possible quantization options. In some cases, it is enough to check only the bit width quantization options that are combinations of data types available on a computer platform, such as 8, 16, and 32 bits. In other cases, there is a need to further optimize the memory footprint within particular bit widths, and then all the bit width precisions in between those particular bit widths are also considered. As CNNs are typically trained and evaluated on huge datasets, evaluating each quantization level combination according to conventional techniques can easily take many hours.

Accordingly, quantization combinations may be limited. Consider that computations in CNN execution include both the convolutional operation and the classification operation via fully connected layers as described with respect to FIG. 1. Both could be written as the generic multiply and accumulate operation below:

$$A = \Sum_{i=1}^{N} p_i d_i \quad \text{Eqn. 1}$$

where $p_i$ are the parameters of the CNN, $d_i$ are data values, A is the accumulator for the final result, and N is the total number of parameters used for the computation. In embodiments, the parameters may be neural network weights. The parameters may also be values that are set during the deep learning training process. The parameters are fixed at the time the network is used in an application, such as recognizing faces.

In embodiments, the quantization procedure will choose the number representation used for the data and the associated parameters that are more efficient than the typical high precision floating point representation. The discussion below first considers an integer data representation with a certain number of bits. Later, the related fixed-point representation is discussed. Note that the quantization results in efficient computation, but also will reduce the memory footprint of the network. Computation speed may also be improved, however the search procedure described herein for quantization combinations can be also used to select the quantization that uses a minimum amount memory but still yields an efficient and accurate CNN solution.

Figure 2:
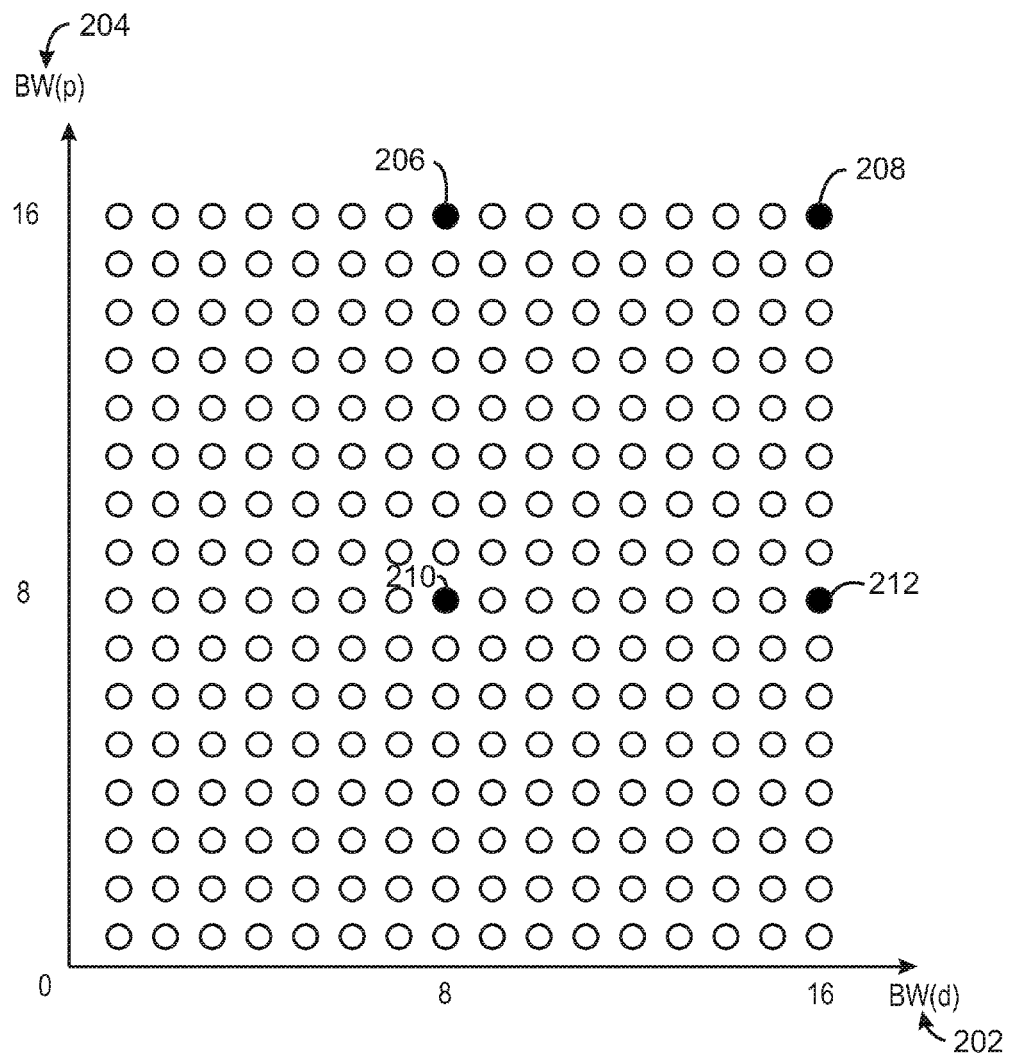
FIG. 2 is a graph illustrating a plurality of quantization points.

FIG. 2 is a graph 200 illustrating a plurality of quantization points. The x-axis 202 represents the bit width of the data, while the y-axis 204 represents the bit width of the parameters. The dots 206, 208, 210, and 212 are the quantization points typically considered on a platform with wide accumulation support and data that includes 8-bit and 16-bit data formats as described below.

To determine the quantization points, first the parameters are analyzed and an optimal quantization that fits one of the available data types is selected. Thus, the parameter bit width may set based on available the data types and denoted as BW(p). For example, a processor may have a set of supported data types. Those data types are determined by the available hardware. Some data types might be emulated in software, but those data types will be less efficient than the data types with hardware support. In the example of FIG. 2, the available data types are 8-bit or 16-bit in width. This data bit width may be denoted as BW(d). After the optimal quantization for the parameters is selected, the data may be analyzed and the optimal data quantization that fits one of the available data types is selected. This data bit width may be denoted as BW(d).

A determination may be made regarding the width of the accumulator. In particular, a determination may be made as to if the accumulator is wide enough for efficient processing using the quantized parameters. If the quantized parameters $p_i$ and data $d_i$ are represented as integers, and their bit width is denoted as BW(p) and BW(d), then the final accumulated result will have the worst-case scenario bit width of:

$$BW(A) \geq BW(p) + BW(d) + \log_2 N \quad \text{Eqn. 2}$$

For an exemplary network with 8-bit data, 8-bit parameters, and a large N=5×5×32 kernel, approximately 26 bits are needed for the accumulator in the worst case scenario (8+8+$\log_2$(5×5×32)). Thus, in a worst case scenario, the accumulator bit width is greater than or equal to the sum of the parameter bit width, data bit width, and the binary logarithm of the kernel. The network may then be adapted to the new format (or a number of possible formats) and the recognition performance of the quantized network is check for accuracy when compared to the non-quantized network.

In FIG. 2, the quantization options are illustrated in a 2D space ranging to a maximum of 16 bits. While the maximum is illustrated as 16 bits, any number of bits may be used. Conventional techniques may consider only the dots 206, 208, 210, and 212 in the graph 200. In particular, the combinations of 8-bit data, 8-bit parameters, 8-bit data, 16-bit parameters, 16-bit data, 8-bit parameters, and 16-bit data, 16-bit parameters may be checked to determine if the accumulator support is adequate. Checking the accumulator bit width is not an issue for dedicated computer vision platforms, as they work efficiently with wide accumulators. However, on platforms with wider accumulator emulation of the wide accumulators, this leads to poor performance. In embodiments, wider accumulator emulation enables emulation of a wide accumulator via software. In the software emulation, accumulator overflows are detected and additional bits are stored somewhere else in the memory. This is however much less efficient than a hardware accumulator solution. In some cases, there may be quantization points in the 2D space grid of FIG. 2 that give better performance than the combination bit widths represented by dots 206, 208, 210, and 212. Exploring the entire space might be very slow as each point requires running the network over a very large dataset to evaluate the inference performance.

Thus, the present techniques explore the quantization space efficiently by focusing on the solutions that optimally use a narrow accumulator. The narrow accumulator may be used without emulation. To use a narrow accumulator, as described above a quantization for the network parameters is selected. The network parameter selection may begin with a minimal meaningful value of 1 bit. Often, a higher value may be used, such as 2 or 3 bits, as 1 bit might hold too little information for quantization. In examples, the starting point for parameter quantization is a number between 1 bit and accumulator bit width. The order can be also reversed, where parameter quantization begins at the accumulator bit width and checks down to 1-bit to determine the most efficient parameter quantization. In embodiments, the most efficient parameter quantization may be the quantization that can represent the parameters with the least amount of lost information. Additionally, in embodiments, the most efficient parameter quantization may be the quantization that can represent the parameters wherein the information lost by quantization is below a predetermined threshold.

Next, based on the known accumulator size and the chosen parameter representation, the optimal data quantization is calculated such that the result fits into the accumulator. The optimal data quantization can be found using techniques similar to the parameter quantization. The optimal data quantization can be determined across a range of vales from 1 bit to the accumulator bit width. Also, the most efficient data quantization may be the quantization that can represent the data with the least amount of lost information or the quantization that can represent the data wherein the information lost by quantization is below a predetermined threshold.

The network is then adapted for the new formats, wherein the new format is at least the newly selected bit widths. In particular the network may be adapted to the new bit widths of the network. Adapting the network can include two functions: first, once the data and parameter precision is changed, then the software associated with the CNN is changed to execute data and parameters with the new precision. Second, in some cases the network may also be retrained using the chosen bit-widths. Retraining the network may take a long time. Thus, in some cases the software may be adapted to execute data and parameters with the new precision then the result evaluated. Based on the recognition performance of the adapted software, a predetermined number of solutions may be selected, and the network may be retrained with those solutions. In embodiments, the predetermined number of solutions is 20%. The best solution is then selected as the best in recognition performance.

The inference performance of the resultant quantized CNN may be checked on a test data set, where inference includes recognition performance. If the parameter quantization is not at some minimal value (e.g. 1 bit), the quantization level may be further reduced for the parameters. In embodiments, 2 or 3 bits may be selected as the minimal value, where going below that minimal bit value will lead to poor recognition performance. Finally, the quantization point with the best performance or best recognition is selected. The best performance or recognition may be determined based on the accuracy of the CNN solution when ran on a dataset. For example, the best performance or recognition may be determined based on the accuracy of the facial recognition from the quantized CNN. As used herein, good performance or accurate performance by the CNN may refer to CNN solutions that are correct above a predetermined threshold. This threshold may be set prior to run time of the CNN.

The above procedure is considers the solutions that optimally use the accumulator. This results in a very small number of solutions being tested. The constraint on the accumulator size transforms the search problem from a 2D search across parameter and data quantization options, to a 1D search across only the solutions that optimally use the accumulator. If the performance is not good enough (yielding too few correct solutions), then software emulation of the wider accumulations may be used. Another option is to split the computation kernel in multiple parts, compute each of them separately and combine at the end.

Note that the accumulator size is used as a constraint. Consider the following worst-case scenario. To explore only the solutions that maximally use the accumulator Eqn. 2 can be used as a constraint. Again:

$$BW(A) \geq BW(p) + BW(d) + \log_2 N \qquad \text{Eqn. 2}$$

where the accumulator is a 16-bit accumulator. For the above example of a 5×5×32 kernel this would mean:

$$16 - \log_2 5*5*32 = 6 \geq BW(p) + BW(d) \qquad \text{Eqn. 3}$$

As result of the constraint, only a few combinations of the bit width widths of the data and the parameters need to be considered. This is illustrated in FIG. 3.

Figure 3:
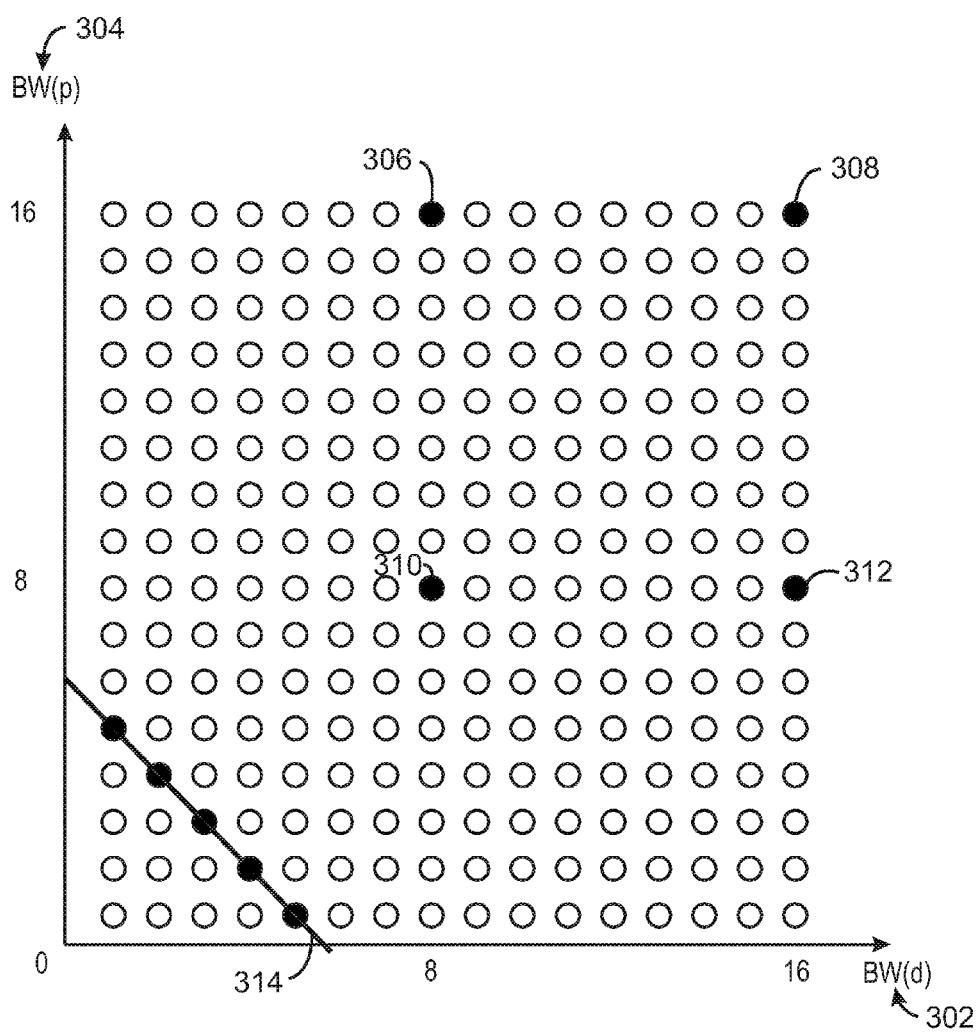
FIG. 3 is a graph illustrating a plurality of quantization points.

FIG. 3 is a graph 300 illustrating a plurality of quantization points. The x-axis 302 represents the bit width of the data, while the y-axis 304 represents the bit width of the parameters. The dots are 306, 308, 310, and 312 are the quantization points typically considered on a platform with wide accumulation support and data that includes 8-bit and 16-bit data formats. The line 314 illustrates the constraint of an accumulator width of 6 as described in Eqn. 3, wherein $6 \geq BW(p) + BW(d)$. The dots along the line 314 are considered solutions with optimal accumulator use.

FIG. 3 illustrates a worst-case scenario for a narrow 16-bit accumulator. The narrow accumulator leaves a very small number of bits for choosing the quantization levels. If the accumulator is representing the parameters and data in two's complement format, the worst case final value of the accumulator is estimated and used as the constraint. Using the two's complement format, the parameters of a trained network are known and a much better bound can be calculated as:

$$BW(A) = \log_2 \Sigma_{i=1}^{N} |p_i| + BW(d) \qquad \text{Eqn. 4}$$

This constraint will typically give more bits available for the parameters and the data. Here, the network parameters may be fixed and the CNN pre-trained. In particular, the accumulator bit width may be the binary logarithm of the parameters (two's compliment) summed with the bit width of the data. The main reason is that the large kernels used in CNNs usually have many small values. The solutions to consider then are illustrated in FIG. 4.

Figure 4:
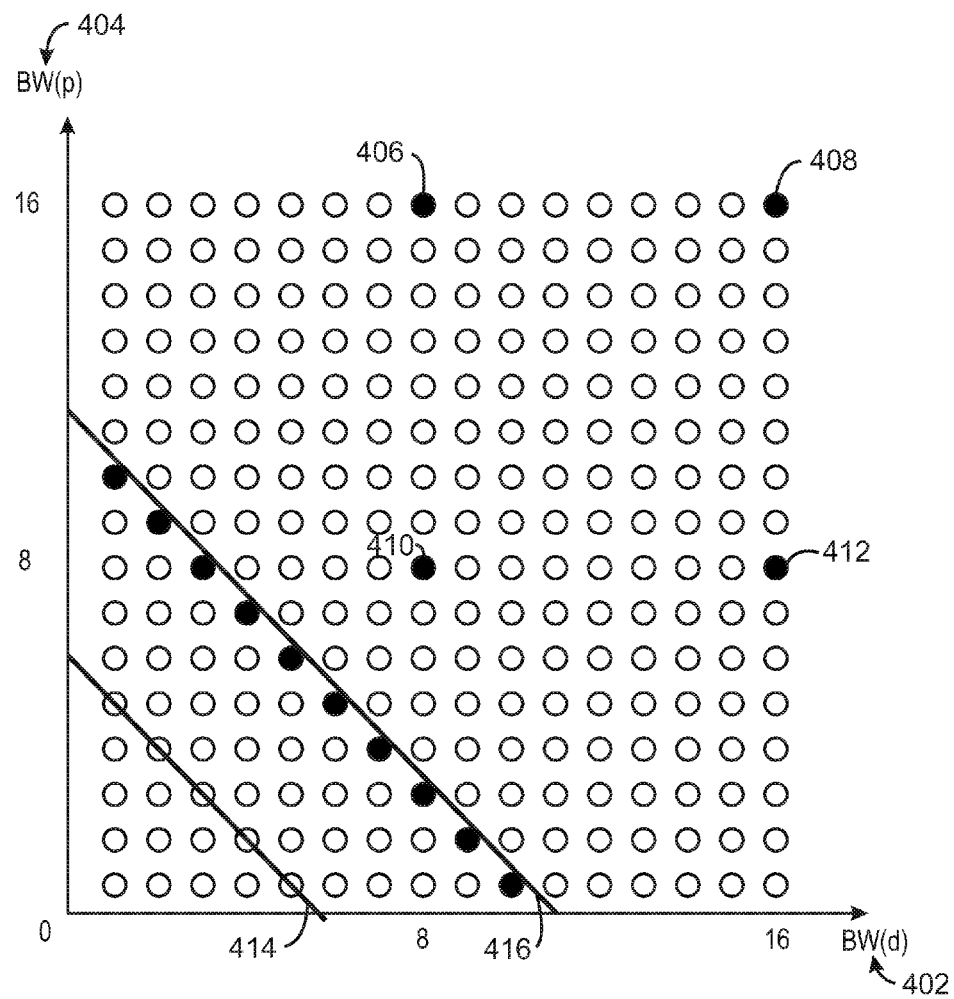
FIG. 4 is a graph illustrating a plurality of quantization points.

FIG. 4 is a graph 400 illustrating a plurality of quantization points. The x-axis 402 represents the bit width of the data, while the y-axis 404 represents the bit width of the parameters. The dots are 406, 408, 410, and 412 are the quantization points typically considered on a platform with wide accumulation support and data that includes 8-bit and 16-bit data formats. The line 414 illustrates the constraint of an accumulator width of 6 as described in Eqn. 3. The dots along the line 414 are considered solutions with optimal accumulator use. A second constraint as described by Eqn. 4 is illustrated by line 416. As illustrated, line 416 uses two's compliment and known fixed parameter values.

The constraint can be further relaxed to allow more bit combinations by considering the typically available large datasets and then estimating the range of the final accumulator value. As used herein, the final accumulator value is a value obtained after all accumulations have been executed. The accumulator value is calculated across all the data and the maximum value taken as the bound:

$$BW(A) = \log_2 \max_{dataset} \Sigma_{i=1}^{N} p_i d_i \qquad \text{Eqn. 5}$$

This constraint is determined by the available data and does not guarantee that the final value does not overflow for some new available data. In addition, noise and some transformations can be added to the data to reduce the chance that the accumulator final value overflows the bit-width.

Previous examples have been described using integer arithmetic. In particular, the above examples use integer multiplications and additions which preserve all bits till the end of accumulation. Below are fixed point multiplications and additions where some fractional bits may be removed at each multiplication and/or addition. Note that some hardware solutions have support for either integer arithmetic, fixed point multiplication, or a combination of both.

In embodiments, fixed point representation may be used where the bits are shifted after each multiplication to ensure fixed number of fractional bits. Let FL denote the chosen fractional length and IL denote the integer length for accumulator A:

$$BW(A) = IL(A) + FL \qquad \text{Eqn. 6}$$

'And the equations hold now for the integer length:
Worst case (Eqn. 2):

$$IL(A) = IL(p) + IL(d) + \log_2 N \qquad \text{Eqn. 7}$$

Using parameters (Eqn. 4):

$$IL(A) = \log_2 \Sigma_{i=1}^{N} |p_i| + IL(d) \qquad \text{Eqn. 8}$$

Using data (Eqn. 5):

$$IL(A) = \log_2 \max_{dataset} \Sigma_{i=1}^{N} p_i d_i \qquad \text{Eqn. 9}$$

Since the fractional length FL is an additional parameter, more fractional bits might give more room for choosing wider number representations, but at a certain point the inference performance would drop. Searching for an optimal solution for quantization using the fractional length FL=0 includes calculating the performance. Next, increase the FL by 1 and repeat until the inference performance starts reducing (in some cases a certain drop inference performance may be acceptable if larger fractional length allows faster computation). Put another way, in general, instead of keeping all bits till the end of accumulation, some of the least significant bits can be removed during in-between calculations when using a fixed point representation. Thus, the most general formulation is splitting the sum into arbitrary sub-sums, and then removing the bits before summing the sub-sums.

The present techniques can be applied to CNNs such as LeNet, AlexNet, and VGG-16. Each of these networks can be executed within a small 16-bit accumulator. In particular, quantization of a small 5-layer Convolutional Neural Network that is trained on the MNIST handwritten digit database (60000 images) yields a network accuracy of over 99% when using a 10000-image validation dataset, where the number of images that are classified correctly are counted. In embodiments, the selected optimum performance is not symmetric. In some cases, the convolution layers perform better if more bits are reserved for parameters. However, the fully connected layers perform better if more bits are reserved for the data.

Similarly, quantization of the AlexNet (2012) network that is retrained on the Oxford-102 flower database including approximately 8000 images, yields an accuracy of over 93%. Here, the accuracy values reported are obtained by forwarding a small 1020-image validation dataset, and counting the number of images that are being classified correctly. Finally, a quantization of a pre-trained version of the 16-layer VGG network, yields an accuracy of over 67%. Here, the accuracy values reported are obtained by forwarding a 5000-image validation dataset through the network, and counting the number of images that are being classified correctly. Note that the accuracy is the top-1 accuracy, while most literature reports the top-5 accuracy (classification is correct if ground-truth is in top 5 predictions). The 5000 images are randomly extracted from the official image validation dataset.

Figure 5:
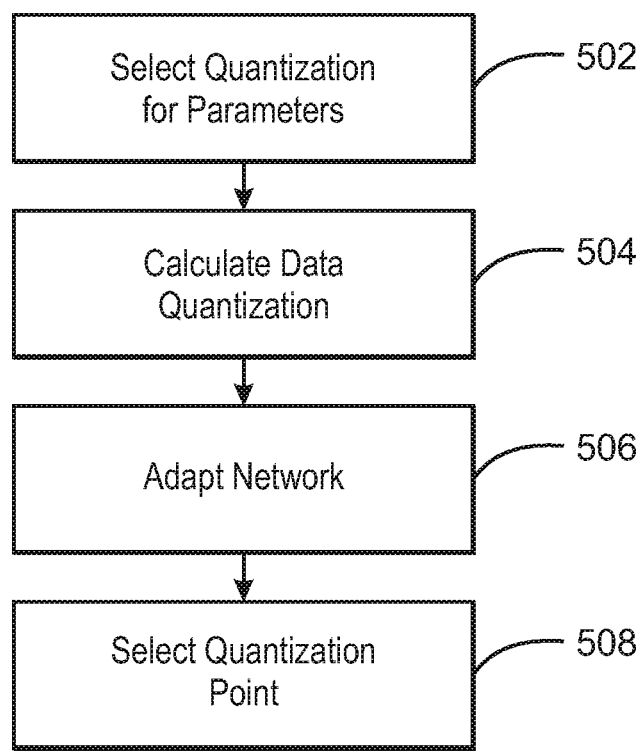
FIG. 5 is a process flow diagram of a method for accumulator constrained quantization of convolutional neural networks.

FIG. 5 is a process flow diagram of a method 500 for accumulator constrained quantization of convolutional neural networks. In embodiments, the method 500 is executed via computing platforms without wide accumulator support. Emulation of a wide accumulator on processors without wide accumulator support is not as efficient as quantization constrained by the hardware accumulator. At block 502, the quantization scheme to be applied to the parameters is selected.

At block 504, based on the parameter quantization and accumulator bit width, the data quantization is calculated.

At block 506, the network is adapted to the data quantization, parameter quantization, and accumulator bit width.

At block 508, a quantization point is selected.

This process flow diagram is not intended to indicate that the blocks of the example process 500 are to be executed in any particular order, or that all of the blocks are to be included in every case. Further, any number of additional blocks not shown may be included within the example process 300, depending on the details of the specific implementation.

The present techniques may be used to find solutions that run efficiently on computing hardware with narrow accumulators. Moreover, the solutions are found quickly without the exhaustive search but by only considering the solutions that optimally use the accelerator. Furthermore, the proposed techniques can be also used to efficiently search minimum memory footprint solutions also on the compute platforms with wide accumulator. The approach could be also used for efficient hardware design or field-programmable gate array (FPGA) mapping of CNNS. Also, the present techniques can be applied to any other number representation, such as a non-uniform quantization. A non-uniform quantization may include removing bits is dividing the space in equal bins. A user might decide to use a set of non-uniform bins and then encode each value with some number. Then the multiplications and additions replacement is defined in this encoding.

Figure 6:
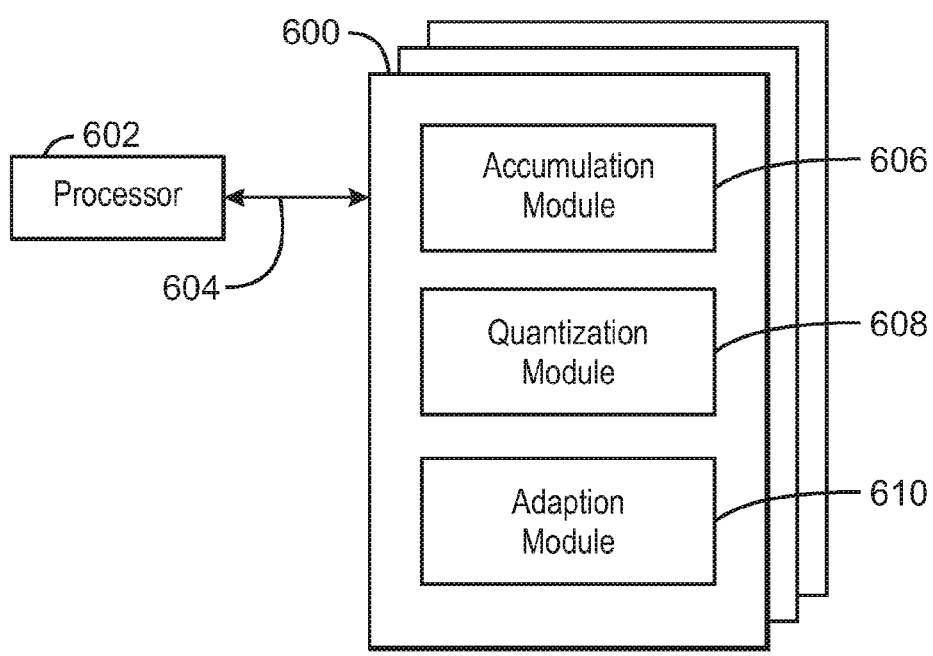
FIG. 6 is a block diagram showing a medium that contains logic for accumulator constrained quantization of convolutional neural networks.

FIG. 6 is a block diagram showing a medium 600 that contains logic for accumulator constrained quantization of convolutional neural networks. The medium 600 may be a computer-readable medium, including a non-transitory medium that stores code that can be accessed by a processor 602 over a computer bus 604. For example, the computer-readable medium 600 can be volatile or non-volatile data storage device. The medium 600 can also be a logic unit, such as an Application Specific Integrated Circuit (ASIC), a Field Programmable Gate Array (FPGA), or an arrangement of logic gates implemented in one or more integrated circuits, for example.

The medium 600 may include modules 606-610 configured to perform the techniques described herein. For example, an accumulation module 606 may be configured to constrain quantization. In particular, the accumulation module 606 may be used to derive quantization values. A quantization module 608 may be configured to adapt quantize parameters and data based on values derived from the accumulation module. An adaptation module 610 may be configured to adapt the network to the quantized parameters and data. In some embodiments, the modules 606-610 may be modules of computer code configured to direct the operations of the processor 602.

The block diagram of FIG. 6 is not intended to indicate that the medium 600 is to include all of the components shown in FIG. 6. Further, the medium 600 may include any number of additional components not shown in FIG. 6, depending on the details of the specific implementation.

Example 1 is an apparatus for accumulator constrained quantization of convolutional neural networks. The apparatus includes an accumulator, wherein the accumulator is to accumulate a plurality of values within a predicted bit width; a controller to determine a parameter quantization and a data quantization using the predicted bit-width; and a convolutional neural network (CNN) that is adapted to the data quantization, wherein a quantization point is selected based on the parameter quantization, data quantization, and predicted bit width.

Example 2 includes the apparatus of example 1, including or excluding optional features. In this example, the predicted bit width is the sum of a parameter bit width, and data bit width, and a binary logarithm of a kernel. Optionally, the predicted bit with is a fixed point representation where bits are shifted after each multiplication to ensure fixed number of fractional bits.

Example 3 includes the apparatus of any one of examples 1 to 2, including or excluding optional features. In this example, the predicted bit width is the sum of a binary logarithm of the parameters and a data bit width, wherein the parameters are fixed. Optionally, the CNN is pre-trained using the fixed parameters. Optionally, the predicted bit with is a fixed point representation where bits are shifted after each multiplication to ensure fixed number of fractional bits.

Example 4 includes the apparatus of any one of examples 1 to 3, including or excluding optional features. In this example, a final accumulator value is estimated and a maximum accumulator value is used to determine the predicted bit width. Optionally, a large dataset is used to determine the maximum accumulator value. Optionally, the predicted bit with is a fixed point representation where bits are shifted after each multiplication to ensure fixed number of fractional bits.

Example 5 includes the apparatus of any one of examples 1 to 4, including or excluding optional features. In this example, another quantization point is selected based on the parameter quantization, data quantization, and accumulator bit width if the parameter quantization is not a minimum value.

Example 6 is a method for accumulator constrained quantization of convolutional neural networks. The method includes accumulating a plurality of values within a predetermined bit width; determining a parameter quantization and a data quantization; and adapting a convolutional neural network to the data quantization, wherein a quantization point is selected based on the parameter quantization, data quantization, and accumulator bit width.

Example 7 includes the method of example 6, including or excluding optional features. In this example, the accumulator bit width is a narrow bit width.

Example 8 includes the method of any one of examples 6 to 7, including or excluding optional features. In this example, the quantization point is an optimal quantization that fits an available data type.

Example 9 includes the method of any one of examples 6 to 8, including or excluding optional features. In this example, the accumulator bit width is to constrain a convolution operation and a classification operation of the convolutional neural network. Optionally, the convolution operation and the classification operation are executed via a multiply and accumulate operation.

Example 10 includes the method of any one of examples 6 to 9, including or excluding optional features. In this example, the quantization point is selected via a search procedure that is limited to a subset of possible quantization points, wherein the subset of possible quantization points are constrained by the accumulator bit width.

Example 11 includes the method of any one of examples 6 to 10, including or excluding optional features. In this example, the parameters and data are represented as integers.

Example 12 includes the method of any one of examples 6 to 11, including or excluding optional features. In this example, the parameters and data are represented in a two's compliment format.

Example 13 includes the method of any one of examples 6 to 12, including or excluding optional features. In this example, the data quantization and the parameter quantization are non-uniform quantizations.

Example 14 includes the method of any one of examples 6 to 13, including or excluding optional features. In this example, the accumulated values are accumulated via software emulation.

Example 15 is a system for accumulator constrained quantization of convolutional neural networks. The system includes an accumulator to accumulate data values within a predicted bit width; a memory that is to store instructions and that is communicatively coupled to the accumulator; and a processor communicatively coupled to the accumulator and the memory, wherein when the processor is to execute the instructions, the processor is to: determine a parameter quantization and a data quantization using the predicted bit-width; and adapt a convolutional neural network (CNN) to the data quantization, wherein a quantization point is selected based on the parameter quantization, data quantization, and predicted bit width.

Example 16 includes the system of example 15, including or excluding optional features. In this example, the predicted bit width is the sum of a parameter bit width, and data bit width, and a binary logarithm of a kernel. Optionally, the predicted bit with is a fixed point representation where bits are shifted after each multiplication to ensure fixed number of fractional bits.

Example 17 includes the system of any one of examples 15 to 16, including or excluding optional features. In this example, the predicted bit width is the sum of a binary logarithm of the parameters and a data bit width, wherein the parameters are fixed. Optionally, the CNN is pre-trained using the fixed parameters. Optionally, the predicted bit with is a fixed point representation where bits are shifted after each multiplication to ensure fixed number of fractional bits.

Example 18 includes the system of any one of examples 15 to 17, including or excluding optional features. In this example, a final accumulator value is estimated and a maximum accumulator value is used to determine the predicted bit width. Optionally, a large dataset is used to determine the maximum accumulator value. Optionally, the predicted bit with is a fixed point representation where bits are shifted after each multiplication to ensure fixed number of fractional bits.

Example 19 includes the system of any one of examples 15 to 18, including or excluding optional features. In this example, another quantization point is selected based on the parameter quantization, data quantization, and accumulator bit width if the parameter quantization is not a minimum value.

Example 20 is a tangible, non-transitory, computer-readable medium. The computer-readable medium includes instructions that direct the processor to accumulate a plurality of values within a predetermined bit width; determine a parameter quantization and a data quantization; and adapt a convolutional neural network to the data quantization, wherein a quantization point is selected based on the parameter quantization, data quantization, and accumulator bit width.

Example 21 includes the computer-readable medium of example 20, including or excluding optional features. In this example, the accumulator bit width is a narrow bit width.

Example 22 includes the computer-readable medium of any one of examples 20 to 21, including or excluding optional features. In this example, the quantization point is an optimal quantization that fits an available data type.

Example 23 includes the computer-readable medium of any one of examples 20 to 22, including or excluding optional features. In this example, the accumulator bit width is to constrain a convolution operation and a classification operation of the convolutional neural network. Optionally, the convolution operation and the classification operation are executed via a multiply and accumulate operation.

Example 24 includes the computer-readable medium of any one of examples 20 to 23, including or excluding optional features. In this example, the quantization point is selected via a search procedure that is limited to a subset of possible quantization points, wherein the subset of possible quantization points are constrained by the accumulator bit width.

Example 25 includes the computer-readable medium of any one of examples 20 to 24, including or excluding optional features. In this example, the parameters and data are represented as integers.

Example 26 includes the computer-readable medium of any one of examples 20 to 25, including or excluding optional features. In this example, the parameters and data are represented in a two's compliment format.

Example 27 includes the computer-readable medium of any one of examples 20 to 26, including or excluding optional features. In this example, the data quantization and the parameter quantization are non-uniform quantizations.

Example 28 includes the computer-readable medium of any one of examples 20 to 27, including or excluding optional features. In this example, the accumulated values are accumulated via software emulation.

Example 29 is an apparatus for accumulator constrained quantization of convolutional neural networks. The apparatus includes instructions that direct the processor to an accumulator, wherein the accumulator is to accumulate a plurality of values within a predicted bit width; a means to determine a parameter quantization and a data quantization using the predicted bit-width; and a convolutional neural network (CNN) that is adapted to the data quantization, wherein a quantization point is selected based on the parameter quantization, data quantization, and predicted bit width.

Example 30 includes the apparatus of example 29, including or excluding optional features. In this example, the predicted bit width is the sum of a parameter bit width, and data bit width, and a binary logarithm of a kernel. Optionally, the predicted bit with is a fixed point representation where bits are shifted after each multiplication to ensure fixed number of fractional bits.

Example 31 includes the apparatus of any one of examples 29 to 30, including or excluding optional features. In this example, the predicted bit width is the sum of a binary logarithm of the parameters and a data bit width, wherein the parameters are fixed. Optionally, the CNN is pre-trained using the fixed parameters. Optionally, the predicted bit with is a fixed point representation where bits are shifted after each multiplication to ensure fixed number of fractional bits.

Example 32 includes the apparatus of any one of examples 29 to 31, including or excluding optional features. In this example, a final accumulator value is estimated and a maximum accumulator value is used to determine the predicted bit width. Optionally, a large dataset is used to determine the maximum accumulator value. Optionally, the predicted bit with is a fixed point representation where bits are shifted after each multiplication to ensure fixed number of fractional bits.

Example 33 includes the apparatus of any one of examples 29 to 32, including or excluding optional features. In this example, another quantization point is selected based on the parameter quantization, data quantization, and accumulator bit width if the parameter quantization is not a minimum value.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus, comprising:
   an accumulator, wherein the accumulator is to accumulate a plurality of values within a predicted bit width;
   a controller to determine a parameter quantization and a data quantization using the predicted bit-width; and
   a convolutional neural network (CNN) that is adapted to the data quantization, wherein a quantization point is selected based on the parameter quantization, data quantization, and predicted bit width.

2. The apparatus of claim 1, wherein the predicted bit width is the sum of a parameter bit width, and data bit width, and a binary logarithm of a kernel.

3. The apparatus of claim 1, wherein the predicted bit width is the sum of a parameter bit width, and data bit width, and a binary logarithm of a kernel and wherein the predicted bit with is a fixed point representation where bits are shifted after each multiplication to ensure fixed number of fractional bits.

4. The apparatus of claim 1, wherein the predicted bit width is the sum of a binary logarithm of the parameters and a data bit width, wherein the parameters are fixed.

5. The apparatus of claim 1, wherein the predicted bit width is the sum of a binary logarithm of the parameters and a data bit width, wherein the parameters are fixed and wherein the CNN is pre-trained using the fixed parameters.

6. The apparatus of claim 1, wherein the predicted bit width is the sum of a binary logarithm of the parameters and a data bit width, wherein the parameters are fixed and wherein the predicted bit with is a fixed point representation where bits are shifted after each multiplication to ensure fixed number of fractional bits.

7. The apparatus of claim 1, wherein a final accumulator value is estimated and a maximum accumulator value is used to determine the predicted bit width.

8. The apparatus of claim 1, wherein a final accumulator value is estimated and a maximum accumulator value is used to determine the predicted bit width and wherein a large dataset is used to determine the maximum accumulator value.

9. The apparatus of claim 1, wherein a final accumulator value is estimated and a maximum accumulator value is used to determine the predicted bit width and wherein the predicted bit with is a fixed point representation where bits are shifted after each multiplication to ensure fixed number of fractional bits.

10. The apparatus of claim 1, wherein another quantization point is selected based on the parameter quantization, data quantization, and accumulator bit width if the parameter quantization is not a minimum value.

11. A method, comprising:
    accumulating a plurality of values within a predetermined bit width;
    determining a parameter quantization and a data quantization; and
    adapting a convolutional neural network to the data quantization, wherein a quantization point is selected based on the parameter quantization, data quantization, and accumulator bit width.

12. The method of claim 11, wherein the accumulator bit width is a narrow bit width.

13. The method of claim 11, wherein the quantization point is an optimal quantization that fits an available data type.

14. The method of claim 11, wherein the accumulator bit width is to constrain a convolution operation and a classification operation of the convolutional neural network.

15. The method of claim 14, wherein the convolution operation and the classification operation are executed via a multiply and accumulate operation.

16. The method of claim 11, wherein the quantization point is selected via a search procedure that is limited to a subset of possible quantization points, wherein the subset of possible quantization points are constrained by the accumulator bit width.

17. A system, comprising:
    an accumulator to accumulate data values within a predicted bit width;
    a memory that is to store instructions and that is communicatively coupled to the accumulator; and
    a processor communicatively coupled to the accumulator and the memory, wherein when the processor is to execute the instructions, the processor is to:
      determine a parameter quantization and a data quantization using the predicted bit-width; and
      adapt a convolutional neural network (CNN) to the data quantization, wherein a quantization point is selected based on the parameter quantization, data quantization, and predicted bit width.

18. The system of claim 17, wherein the predicted bit width is the sum of a parameter bit width, and data bit width, and a binary logarithm of a kernel.

19. The system of claim 17, wherein the predicted bit width is the sum of a parameter bit width, and data bit width, and a binary logarithm of a kernel and wherein the predicted bit with is a fixed point representation where bits are shifted after each multiplication to ensure fixed number of fractional bits.

20. The system of claim 17, wherein the predicted bit width is the sum of a binary logarithm of the parameters and a data bit width, wherein the parameters are fixed.

21. The system of claim 17, wherein the predicted bit width is the sum of a binary logarithm of the parameters and a data bit width, wherein the parameters are fixed and wherein the CNN is pre-trained using the fixed parameters.

22. The system of claim 17, wherein the predicted bit width is the sum of a binary logarithm of the parameters and a data bit width, wherein the parameters are fixed and wherein the predicted bit with is a fixed point representation where bits are shifted after each multiplication to ensure fixed number of fractional bits.

23. The system of claim 17, wherein a final accumulator value is estimated and a maximum accumulator value is used to determine the predicted bit width.

24. The system of claim 17, wherein a final accumulator value is estimated and a maximum accumulator value is used to determine the predicted bit width and wherein a large dataset is used to determine the maximum accumulator value.

25. The system of claim 17, wherein a final accumulator value is estimated and a maximum accumulator value is used to determine the predicted bit width and wherein the predicted bit with is a fixed point representation where bits are shifted after each multiplication to ensure fixed number of fractional bits.

* * * * *